United States Patent Office 3,495,318
Patented Feb. 17, 1970

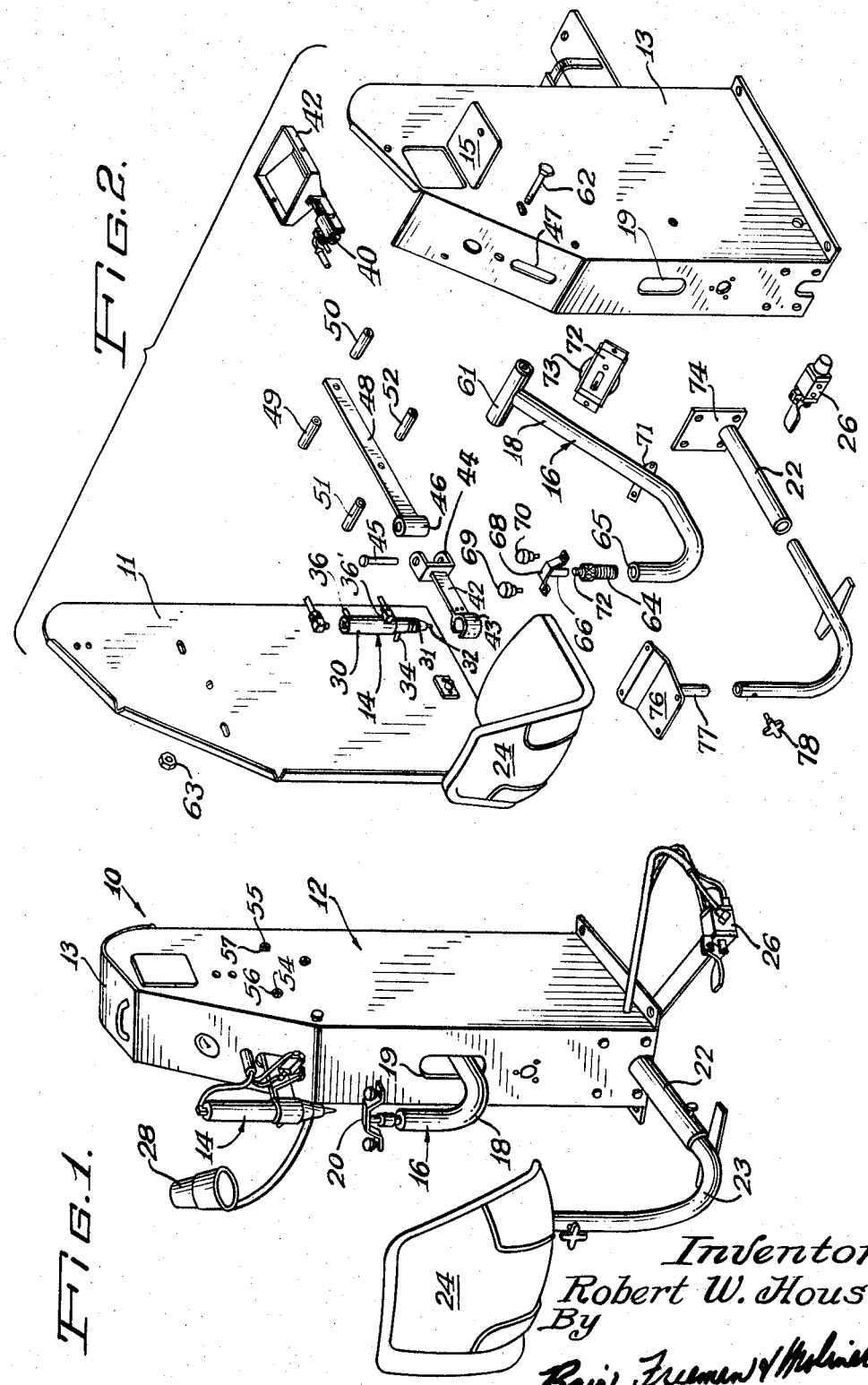

3,495,318
TIRE STUD EQUIPMENT
Robert W. Houston, Cincinnati, Ohio, assignor to
Studebaker Corporation
Filed Sept. 15, 1967, Ser. No. 668,104
Int. Cl. B23q 7/10
U.S. Cl. 29—211                                                     6 Claims

ABSTRACT OF THE DISCLOSURE

A tire studding machine having a tire stud gun carried thereon and a ball-anvil support assembly movably carried on the support housing. The ball-anvil support assembly, which includes a support arm having a ball anvil resiliently supported at one end, with the other end of the support arm being connected to the support housing, is adapted to support a tire for movement toward and away from the tire stud gun. Control means are provided for actuating the ball anvil support assembly to raise the tire to a predetermined position with respect to the tire stud gun and to actuate the tire stud gun to insert a tire stud head-first into a selected opening or bore in the tire tread.

BRIEF SUMMARY OF THE INVENTION

This invention relates to tire studding equipment, and more particularly, to improved tire studding equipment for more readily inserting tire studs or anti-skid devices into tires at a higher rate of production and with greater accuracy and uniformity.

Tire studs or anti-skid devices have proven successful in providing increased traction for vehicle tires under adverse weather conditions, for example, ice and snow. Manual stud guns have been used to insert tire studs into openings drilled into the tire tread of an existing tire or openings molded into the tire tread during manufacture of the tire. Such manual tire stud guns were cumbersome and not adapted for high production insertion of tire studs into tire treads.

More recently, a tire studding machine has been employed to force the studs into the openings in the tire tread. One known machine includes a support housing having a tire support assembly fixedly secured thereon. A manually actuated tire stud gun was movable with respect to the tire support. The tire stud gun comprised essentially a cylindrical housing, a piston reciprocable in the housing, and a head assembly at the front end of the gun and through which a stud is delivered to the tire by each forward movement of the piston. The head assembly includes a plurality of movable jaws which are adapted to be inserted into the openings in the tire for spreading the walls defining each opening so as to facilitate entry of the tire stud head-first into the opening.

In such tire studding machine, the tire stud gun was moved with respect to the tire and due to such movement of the tire stud gun, it was difficult to maintain a uniform depth of insertion of the tire studs into the tire tread. For best operational results of a studded tire, it is desired that the studs be inserted to a uniform depth in the tire tread such that the studs protrude substantially the same distance from the periphery of the tire tread.

Thus, an object of the present invention is to provide FIG. 1 is a right front perspective view of a tire stud gun is maintained at a fixed relation on the machine, and the tire support assembly (which carries a tire thereon) is movable toward and away from the tire stud gun to provide a more uniform depth of insertion of protrusion of the plurality of studs from the tire tread.

Another object of the present invention is to provide an improved tire studding machine having a ball anvil tire support, such ball anvil tire support being resiliently supported on a support arm assembly that is movable toward and away from the tire stud gun on the tire studding machine.

Yet another object of the present invention is to provide an improved tire studding machine having control means for actuating the support arm assembly to raise the ball anvil carrying the tire to position beneath the tire stud gun and for then actuating the tire stud gun to effect insertion of a tire stud head first into a selected opening in the tire tread. Other objects and advantages of the present invention will become more apparent hereinafter.

BRIEF DESCRIPTION OF THE DRAWING

The attached drawing illustrates a preferred embodiment of the invention, in which:

FIG. 1 is a right front perspective view of a tire studding machine embodying the present invention; and FIG. 2 is an exploded perspective view, with parts omitted for clarity, better illustrating the relationship of the ball anvil support assembly with respect to the tire stud gun.

DESCRIPTION OF THE PREFERRED EMBODIMENT

Referring now to FIG. 1 of the drawing, there is illustrated a tire studding machine 10 embodying the present invention. The tire studding machine 10 comprises a support housing or frame 12 carrying thereon at a fixed relationship to the floor a tire stud gun assembly 14. Movably supported on the support housing 12 beneath the tire stud gun assembly 14 is a ball anvil support assembly 16 which includes a support arm 18 and a ball anvil 20 upon which a tire to be studded is supported. The arm 18 extends through an elongated opening 19 in the housing 12.

Connected to the support housing 12 is a clamping tube assembly 22 which supports a seat support 23 which has a seat 24 secured thereto. The operator is conveniently seated on seat 24 at a position forward of the machine such that he can readily mount a tire on the ball anvil 20 and then actuate the two-stage foot valve assembly 26 to (1) raise the ball anvil support assembly 16 into position beneath the tire stud gun 14 and then (2) to actuate the tire stud gun 14 to insert a stud head first into a selected opening in the tire tread. A convenience lamp 28 may be mounted on the support housing 12 adjacent the tire stud gun 14 for better illuminating the work area.

The support housing 12 is provided with a pivotally mounted cover 13 for permitting access to a hopper mechanism within the housing 12 and a service cover 15 permitting access to the interior of the housing for service of interior components.

Turning now to FIG. 2, there is illustrated an exploded perspective view with parts broken away to more clearly show the operative association between the tire stud gun 14 and the ball anvil support assembly 16. The tire stud gun 14 comprises a cylindrical housing 30 having a piston (not shown) reciprocable therein. A base block 31 secured to the cylindrical housing 30 supports a plurality of movable jaws 32 at the lower end thereof which are adapted to be inserted into an opening in the tire tread for spreading walls defining the opening to facilitate reception of a stud head-first into such opening. Typically, three or four jaws may be provided. The tire stud gun 14 is provided with an inlet 34 adapted to be connected to a hopper mechanism 42 which supplies tire studs to the inlet 34 in end-to-end head-first relationship. The piston within the tire stud gun may be of the double-acting pneumatic type, in which case the fittings 36 and 36' are adapted to be connected to the foot valve assembly 26, and the fitting 38 is adapted to be connected to the feed mechanism 40 associated with the hopper 42 which stores a supply of studs in random fashion therein. If desired, a single acting spring return piston means can be used.

The tire stud gun 14 is retained in a front gun support assembly 42, which includes a collar or sleeve portion 43 for receiving and supporting the tire stud gun 14. The rear of the front gun support assembly 42 is provided with a clevis portion 44 which is pivotally secured to bearing portion 46 on the front end of the rear main support assembly 48 by a pivot pin 45. The rear main support assembly 48 is fixedly retained in the support housing 12 by means including spacer members or tubes 49, 50, 51 and 52, which are secured between the cabinet sections 11 and 13 of the cabinet 12. The spacers 49 and 50, 51 and 52 and the rear main support assembly 48 are secured in place in the cabinet or housing 12 by suitable fastening means, as for example, bolts 54, 55 and nuts 56, 57 (FIG. 1) threaded on such bolts. It is noted that the rear main support assembly 48 extends through a suitable opening 47 in the front of housing 12.

The ball anvil support assembly 16 comprises a tubular support arm 18 having affixed transversely at one end thereof a tubular member 61 pivotally secured between the cabinet or housing sections 11 and 13 by suitable fastening means, as for example, a bolt 62 and a nut 63. The free end of arm 18 is upwardly turned and the opening is internally threaded. A ball support screw 64 which is exteriorly threaded is received cooperatively within the internal threads of the end of the arm 18. The ball support screw 64 has a recess or opening in the upper end thereof for receiving a depending tubular portion 66 of the ball bearing support plate 68 of the anvil means 20. A pair of ball bearings 69 and 70, which support a tire thereon, are suitably affixed within openings on opposite ends of the ball bearing support plate 68. The tubular portion 66 depending downwardly from the plate 68 receives therein a spring 72 which is disposed between a shoulder in the blind bore in the ball support screw 64 and the bottom of the support plate 68 within the tubular member 66. The spring 72 biases the support plate 68 outwardly away from the free end of the support arm for accommodating a limited amount of lost motion when the arm moves into position beneath the tire stud gun 14 and the jaws 32 of the tire stud gun 14 enter the opening in the tire tread into which a stud is to be inserted.

The ball support screw 64 is adjustably received within the threaded opening 65 in the free end of the arm 18 so as to provide adjustment of the ball anvil 20 to the proper height with relation to the jaws 32 of the tire stud gun 30. Preferably, the tire surface should be as close to the tips of the jaws 32 as possible without interfering when the tire is rotated to the different positions required for insertion of the plurality of studs in the tire tread. In a presently preferred embodiment the distance between the exterior of the tire tread and the tips of the jaws should not exceed approximately ⅜ of an inch. A greater adjustment will not permit the ball anvil support assembly 16 to reach its optimum position with respect to the stud gun 14 and therefore will not permit insertion of studs to the proper depth in the tire tread.

Intermediate the length of the arm 18, there is provided a bracket 71 which is adapted to be connected to an air chamber and mounting bracket assembly 72. The air chamber and mounting bracket assembly includes a diaphragm actuator 73 adapted to be operatively connected by conduit to the foot valve assembly 26 and to a source of air for pivoting the arm 18 about the axis defined through the tubular member 61 so as to raise and lower the ball anvil 20 and the tire carried thereon with respect to the tire stud gun 14 carried at a relative fixed position on the support housing 12. The air chamber and mounting bracket assembly 72 is connected at one end to the support housing 12 and at the other end, it is connected to the bracket 70 on the arm 18. Expansion of actuator 73 will raise arm 18 and contraction of actuator 73 will lower the arm.

The clamping tube assembly 22 comprises a tubular member having a plate member 74 at one end which is connected to the cabinet 12. The seat support and elbow assembly 23 includes a plate 75 adapted to rest upon a floor or like supporting surface. To the bottom of the seat 24 there is affixed a seat plate bracket 76 which has depending therefrom a rod-like member 77 that extends into the tubular opening in the end of the seat support elbow assembly 23. A knob 78 extends through an opening in the seat support elbow assembly 23 for adjustably retaining the stem portion 77 of the seat plate bracket in place so as to adjustably secure the height of the seat 24 with respect to the floor to better accommodate the operator.

In operation, a tire is placed on the balls 69 and 70 of the ball anvil support 20. The front gun support assembly 42 may be swung to one side from a position out of alignment with the rear main support assembly 48 in order to facilitate mounting of the tire on the ball anvil 20. After the tire has been mounted on the ball anvil, the front gun support assembly 42 may be pivoted about the axis of pivot pin 45 back to alignment with the rear main support assembly 48 and in proper position for later actuation. The tire carried on the ball anvil 20 may be adjusted to the proper height with relation to the jaw 32 of the tire stud gun 14 by screwing the ball anvil 20 up or down with respect to the ball anvil support arm 18.

The opreator may then actuate the foot valve assembly 26 to initiate the studding cycle. The foot valve assembly 26 comprises a two-stage valve. Upon actuation through a predetermined position, air is supplied to the air chamber or actuator 73 of the air chamber and mounting bracket assembly 72 for moving the arm 18 to raise the ball anvil 20 and tire carried thereon to a position beneath the tire stud gun 14. The jaws 32 will enter a selected opening in the tire tread into which a stud is to be inserted. Upon actuation of the foot valve assembly 26 through the second stage, air will be supplied to the tire stud gun 14 to actuate the piston therein and force a tire stud headfirst through the jaws 32 into the opening in the tire tread. When the foot valve 26 is released, pressure will be released from air chamber 73 and the ball anvil support assembly 16 will be permitted to pivot downwardly. The tire can then be rotated on the balls 69 and 70 to align the jaws 32 with the next opening in the tire tread, and the foot pedal may be then again actuated to raise the arm 18 in position beneath the tire stud gun and then to actuate the tire stud gun to insert another stud. This operation continues until all of the desired studs have been inserted in the openings in the tire tread.

After the studding cycle has been completed, the front gun support 42 is pivoted out of alignment with the rear main support 48 so as to swing the tire stud gun 14 out of studding position. The tire can then be readily rotated on the balls 69 and 70 for inspection and then removed from the ball anvil support 20.

There has been provided by the present invention an improved tire studding machine having a ball anvil support assembly movably mounted on the support housing so as to raise and a lower a tire to be studded with respect to a tire stud gun carried on the support housing at a relative fixed position. The balls on the ball anvil support facilitate movement of the tire on the ball anvil support assembly 16 in order to more readily move the tire from one position to the next for sequential insertion of studs into the openings formed in the tire tread. The ball anvil is adjustably carried in a threaded opening in the ball anvil support assembly 16 to permit adjustment of the tire tread with respect to the jaws 32 of the tire stud gun 14. Further, the anvil 20 is resiliently supported on the ball anvil support assembly 16 to permit some "give" between the gun 14 and the anvil 20 to increase the life of the operating components. The two-stage foot valve assembly and associated pneumatic components provide control means for operating the air chamber and mounting bracket assembly 72 to raise and lower the ball anvil support assembly 16 and for actuating the tire stud gun to sequentially insert tire studs in selected openings in the tire tread. Upon actuation of the foot valve assembly 26 through the first stage, the pneumatic actuator member 73 is actuated to raise the arm 18 and the anvil 20 carried thereon into position beneath and in alignment with the jaws 32 of the tire stud gun. When the foot valve assembly 26 is actuated through the second stage, the tire stud gun 14 is operative to insert a stud into the selected opening in the tire tread. Upon release of pressure from the foot valve assembly, the mechanisms will be returned to their starting position.

While I have shown a presently preferred embodiment of the present invention, it will be understood that my invention is not limited thereto, since it may be otherwise embodied within the scope of the following claims:

What is claimed is:

1. In a tire studding machine including a support housing, a tire stud gun mounted on said housing, hopper means on said housing for supplying studs in predetermined relationship to said tire stud gun, and means for supporting a tire to which studs are to be applied in position beneath the tire stud gun, the improvement comprising said tire stud gun being mounted at a fixed elevation on said support housing and said supporting means being movable toward and away from said tire stud gun, said supporting means comprising a support arm connected at one end to the support housing and anvil means on the other end of said support arm for supporting a tire for movement toward and away from said tire stud gun so as to provide more uniform depth of insertion of tire studs into a tire tread.

2. A tire studding machine as in claim 1 wherein the support arm is pivotally connected at one end to the support housing and the anvil means are resiliently supported on the support arm.

3. A tire studding machine as in claim 1 including a pneumatic actuator secured between the support housing and the support arm for pivoting the support arm on the support housing so as to raise and lower the anvil means with respect to the tire stud gun.

4. A tire studding machine as in claim 3 including control means for regulating the supply of air to the pneumatic actuator and to the tire stud gun so as to raise the anvil means (1) to properly position the tire stud gun in an opening into which a tire stud is inserted, and (2) to actuate the tire stud gun for inserting a tire stud into the opening in the tire tread.

5. A tire studding machine as in claim 4 wherein the control means comprises a two-stage foot valve control adapted to be actuated by the operator.

6. A tire studding machine as in claim 2 wherein the anvil means comprises a plate member having a pair of ball supports secured thereon adjacent the opposite ends of said plate member and a depending rod-like member extending from the plate member and engaging with the support arm, and spring means disposed between the depending member and the support arm for biasing the anvil means outwardly from the support arm.

References Cited

UNITED STATES PATENTS 3,367,015   2/1968   Brosene.

THOMAS H. EAGER, Primary Examiner

U.S. Cl. X. R.

29—212